United States Patent
Tachiwa

(10) Patent No.: US 10,063,112 B2
(45) Date of Patent: Aug. 28, 2018

(54) POWER TRANSMISSION APPARATUS, METHOD FOR CONTROLLING POWER TRANSMISSION APPARATUS, AND STORAGE MEDIUM STORING PROGRAM

(71) Applicant: CANON KABUSHIKI KAISHA, Tokyo (JP)

(72) Inventor: Wataru Tachiwa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 15/074,699

(22) Filed: Mar. 18, 2016

(65) Prior Publication Data
US 2016/0276841 A1    Sep. 22, 2016

(30) Foreign Application Priority Data

Mar. 18, 2015    (JP) .................................. 2015-055014

(51) Int. Cl.
*H02J 50/90* (2016.01)
*H02J 50/40* (2016.01)
*H02J 50/80* (2016.01)

(52) U.S. Cl.
CPC ............... *H02J 50/90* (2016.02); *H02J 50/40* (2016.02); *H02J 50/80* (2016.02)

(58) Field of Classification Search
CPC ............. H02J 5/005; H02J 7/025; H02J 17/00
See application file for complete search history.

(56) References Cited

U.S. PATENT DOCUMENTS

| | | | | |
|---|---|---|---|---|
| 2012/0205988 A1* | 8/2012 | Tanabe | ................... | H02J 7/025 307/104 |
| 2013/0082653 A1* | 4/2013 | Lee | ........................ | H02J 7/0027 320/108 |
| 2013/0293028 A1* | 11/2013 | Byun | ..................... | H01F 38/14 307/104 |
| 2014/0028093 A1* | 1/2014 | Aikawa | ................... | H02J 7/025 307/11 |
| 2014/0062395 A1* | 3/2014 | Kwon | .................... | H02J 50/60 320/108 |

(Continued)

FOREIGN PATENT DOCUMENTS

| | | | |
|---|---|---|---|
| JP | 2013-212004 A | | 10/2013 |
| JP | 5544705 B2 | | 7/2014 |

(Continued)

*Primary Examiner* — Rexford Barnie
*Assistant Examiner* — David Shiao
(74) *Attorney, Agent, or Firm* — Canon U.S.A., Inc. IP Division

(57) ABSTRACT

In a case where a notification signal is received from a second power reception apparatus different from a first power reception apparatus while power transmission is performed to the first power reception apparatus, power transmission to the second power reception apparatus is performed according to a result of negotiation with the second power reception apparatus if a power reception value corresponding to information included in the notification signal received from the second power reception apparatus is a sufficient value. The second power reception apparatus is not targeted for the power transmission if the power reception value corresponding to the information included in the notification signal received from the second power reception apparatus is not a sufficient value.

14 Claims, 9 Drawing Sheets

(56) References Cited

U.S. PATENT DOCUMENTS

| | | | |
|---|---|---|---|
| 2015/0061578 A1* | 3/2015 | Keeling | H02J 50/80 |
| | | | 320/108 |
| 2015/0200549 A1* | 7/2015 | Michisaka | H02J 5/005 |
| | | | 307/31 |
| 2016/0261145 A1* | 9/2016 | Kinoshita | H02J 17/00 |

FOREIGN PATENT DOCUMENTS

| | | |
|---|---|---|
| JP | 2014-150636 A | 8/2014 |
| JP | 2015-12634 A | 1/2015 |
| JP | 2015-35911 A | 2/2015 |
| WO | 12/111271 A1 | 8/2012 |

* cited by examiner

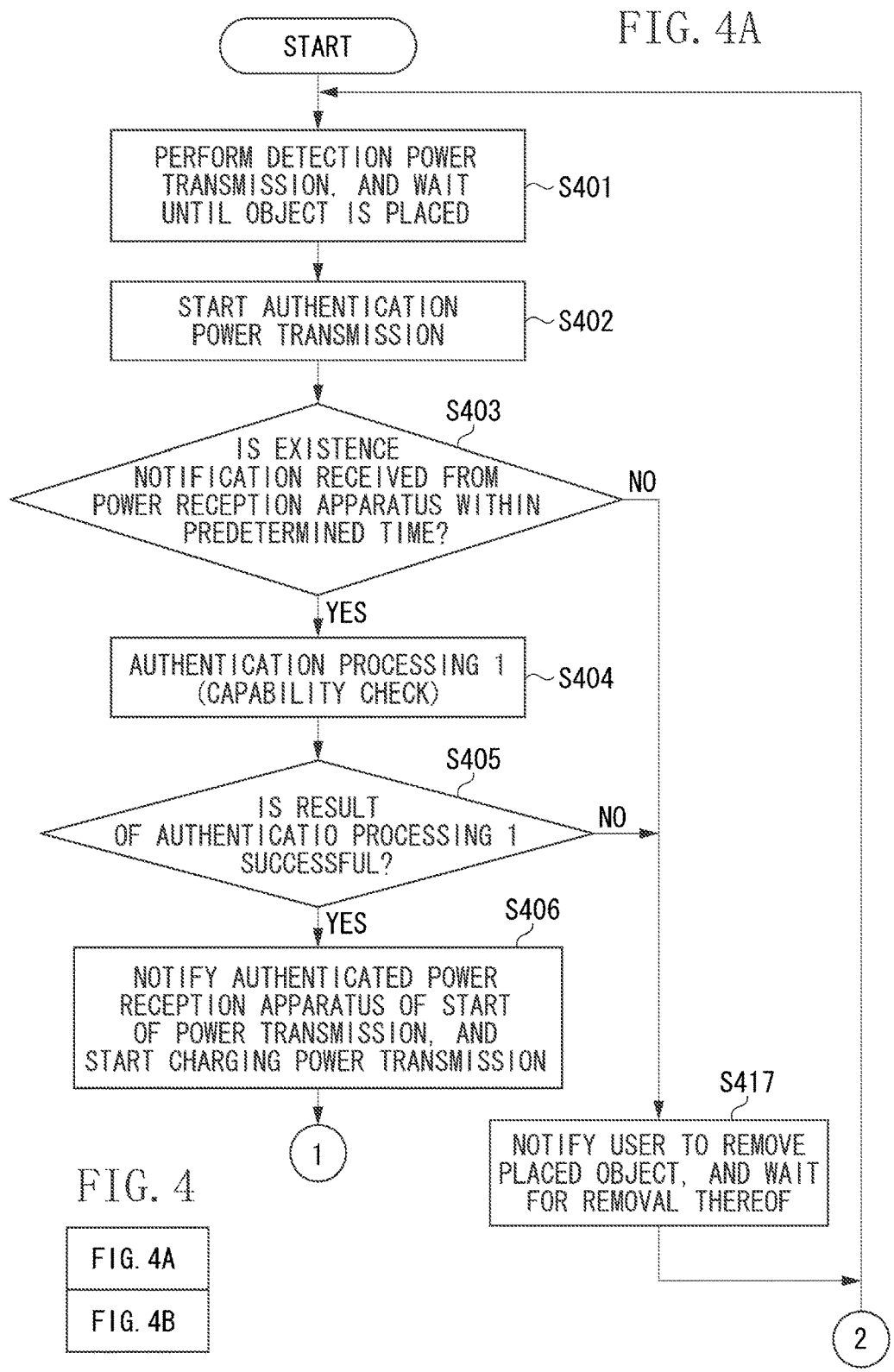

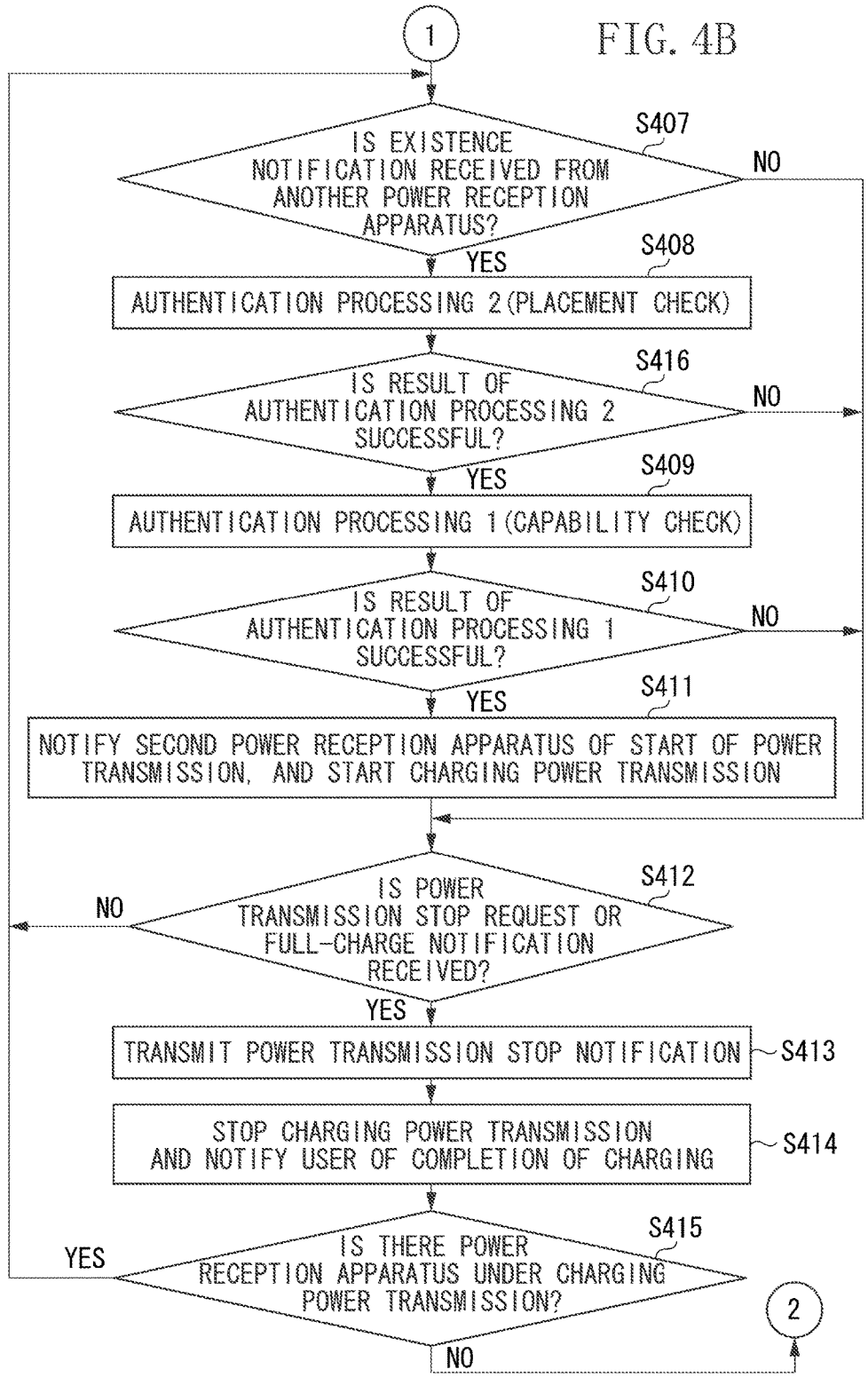

FIG. 7

| POWER TRANSMISSION VOLTAGE | POWER RECEPTION VOLTAGE | |
|---|---|---|
| 10V | 7V OR ABOVE | |
| 20V | 11V OR ABOVE | ~702 |
| 30V | 16V OR ABOVE | ~703 |
| 40V | 19V OR ABOVE | |
| 50V | 23V OR ABOVE | |
| ⋮ | ⋮ | |

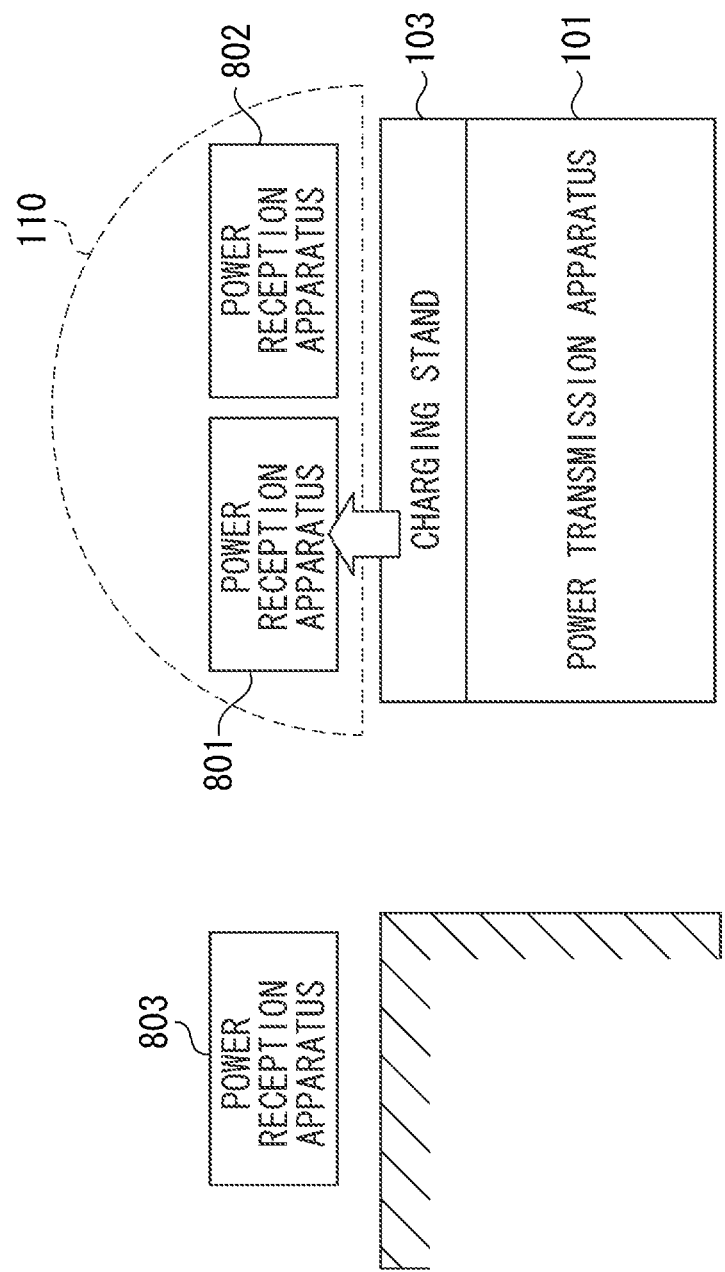

POWER TRANSMISSION APPARATUS, METHOD FOR CONTROLLING POWER TRANSMISSION APPARATUS, AND STORAGE MEDIUM STORING PROGRAM

BACKGROUND OF THE INVENTION

Field of the Invention

The present invention relates to wireless power transmission.

Description of the Related Art

A wireless power transmission system including a power transmission apparatus which wirelessly transmits power and a power reception apparatus which receives the power supplied from the power transmission apparatus has conventionally been known. In such a wireless power transmission system, a power transmission apparatus detects a power reception apparatus existing within a power-transmittable range by detection power transmission of weak power, and performs authentication processing on the detected power reception apparatus based on authentication power transmission. If the authentication succeeds, the power transmission apparatus then starts charging power transmission of higher power to the power reception apparatus (Japanese Patent Application Laid-Open No. 2013-212004). A wireless power transmission system in which a power transmission apparatus can simultaneously perform power transmission to a plurality of power reception apparatuses is also known.

If a power transmission apparatus of a power transmission system which performs authentication processing as discussed in Japanese Patent Application Laid-Open No. 2013-212004 simultaneously performs power transmission to a plurality of power reception apparatuses, a problem can arise in that the power transmission apparatus performs authentication processing even on a power reception apparatus that does not receive power.

For example, when the power transmission apparatus performs charging power transmission to a first power reception apparatus, the power transmission range is wider than that of the detection power transmission and the authentication power transmission since the power of the charging power transmission is higher than that of the detection power transmission and the authentication power transmission. If a second power reception apparatus is placed relatively close to the power transmission apparatus while the power transmission apparatus is performing the charging power transmission to the first power reception apparatus, the second power reception apparatus can detect the charging power transmission being performed to the first power reception apparatus. The second power reception apparatus responds to the charging power transmission being performed to the first power reception apparatus in the same manner as to the detection power transmission and the authentication power transmission, and starts the authentication processing on the power transmission apparatus. In such a case, the power transmission apparatus and the second power reception apparatus may perform the authentication processing therebetween even if the second power reception apparatus does not need to be charged.

SUMMARY OF THE INVENTION

According to an aspect of the present invention, a power transmission apparatus includes a first power transmission unit configured to perform power transmission, a second power transmission unit configured to perform power transmission of higher power than that of the power transmission by the first power transmission unit, a reception unit configured to receive a notification signal for making a notification of existence of a power reception apparatus from the power reception apparatus, and a control unit configured to, in a case where the reception unit receives a notification signal from a power reception apparatus having received the power transmission by the first power transmission unit, cause the second power transmission unit to perform the power transmission according to a result of negotiation with the power reception apparatus from which the notification signal is transmitted, wherein, in a case where the reception unit receives a notification signal from a second power reception apparatus having received the power transmission by the second power transmission unit to a first power reception apparatus, the control unit causes the second power transmission unit to perform the power transmission to the second power reception apparatus according to a result of negotiation with the second power reception apparatus if a power reception value corresponding to power reception information included in the notification signal received from the second power reception apparatus is a sufficient value, and wherein, in the case where the reception unit receives the notification signal from the second power reception apparatus having received the power transmission by the second power transmission unit to the first power reception apparatus, the control unit does not target the second power reception apparatus for the power transmission by the second power transmission unit if the power reception value corresponding to the power reception information included in the notification signal received from the second power reception apparatus is not a sufficient value.

Further features of the present invention will become apparent from the following description of exemplary embodiments with reference to the attached drawings.

BRIEF DESCRIPTION OF THE DRAWINGS

FIG. 4 (4A and 4B) is a flowchart illustrating an operation of the power transmission apparatus.

FIG. 7 is a diagram illustrating a table to be referred to in the authentication processing 2.

FIG. 8 is a diagram illustrating an operation of the wireless power transmission system.

DESCRIPTION OF THE EMBODIMENTS

An exemplary embodiment described below is directed to preventing a power transmission apparatus from targeting a power reception apparatus less likely to need power reception for transmission of high power.

Figure 1:
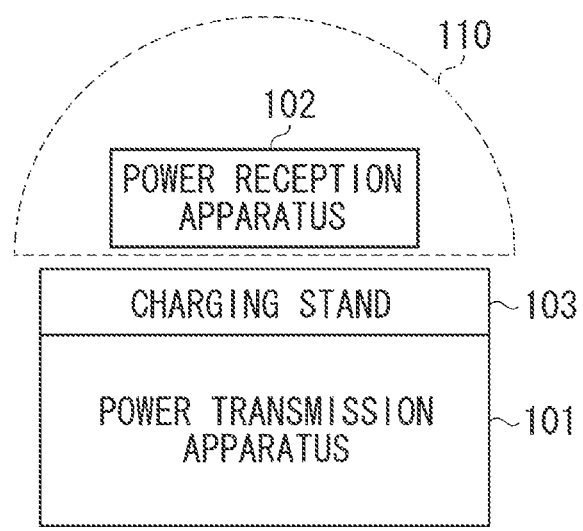
FIG. 1 is a diagram illustrating a configuration of a wireless power transmission system.

FIG. 1 illustrates a configuration of a wireless power transmission system that performs wireless power transmission according to the present exemplary embodiment. The wireless power transmission system according to the present exemplary embodiment performs wireless power transmission by using a magnetic field resonance method. The magnetic field resonance method uses resonance between a magnetic field of a resonator (resonance element) of a power transmission apparatus and that of a resonator (resonance element) of a power reception apparatus. However, the method of wireless power transmission (noncontact power transmission method) is not limited to the magnetic field resonance method. An electromagnetic induction method, an electric field resonance method, a microwave method, and a power transmission method using a laser may be used.

In FIG. 1, a power transmission apparatus 101 wirelessly transmits power. A power reception apparatus 102 can receive the power wirelessly transmitted from the power transmission apparatus 101. The power reception apparatus 102 includes a battery and charges the battery with the power received from the power transmission apparatus 101. The power transmission apparatus 101 can detect the power reception apparatus 102 within a range 110 by detection power transmission. The range 110 is not visible to the user. The user can put the power reception apparatus 102 in the range 110 by placing the power reception apparatus 102 on a charging stand 103. In the wireless power transmission system according to the present exemplary embodiment, the power transmission apparatus 101 and the power reception apparatus 102 perform communication for performing authentication and communicate control information for controlling the wireless communication transmission with each other. Hereinafter, the passing of power between the apparatuses will be referred to as power transmission, power reception, or wireless power transmission. Communications for authentication and exchange of control information between the apparatuses will be referred to simply as communication (wireless communication).

In the wireless power transmission system according to the present exemplary embodiment, the apparatuses perform communication compliant with the Bluetooth (registered trademark) 4.0 standard. The Bluetooth (registered trademark) 4.0 standard defines a communication method called Bluetooth (registered trademark) Low Energy (BLE) which is capable of communication with relatively low power consumption. In the wireless power transmission system according to the present exemplary embodiment, the power transmission apparatus 101 operates as a central defined by BLE. The central is a network master station. To perform power transmission to a plurality of power reception apparatuses at the same time, the power transmission apparatus 101 needs to communicate with each of the plurality of power reception apparatuses. To communicate with each of the plurality of power reception apparatus, the power transmission apparatus 101 then operates as the central. The power reception apparatuses operate as peripherals defined by BLE. The peripherals connect to the central and perform communication based on control of the central. The power transmission apparatus 101 may serve as a peripheral, and the power reception apparatus 102 the central.

In the present exemplary embodiment, communication is performed in compliance with BLE. However, other communication standards may be used. For example, a wireless local area network (LAN) (The Institute of Electrical and Electronics Engineers, Inc. (IEEE) 802.11 series) may be used. Communication in the present exemplary embodiment may be performed by near field communication (NFC) or ZigBee. Communication may be performed by using an original communication method and/or load modulation. While one power transmission apparatus and one power reception apparatus are described here, two or more power transmission apparatuses and two or more power reception apparatuses may be used.

Next, a configuration of the apparatuses of the wireless power transmission system will be described. FIG. is a diagram illustrating a configuration of the power transmission apparatus 101 of the wireless power transmission system. A control unit 201 controls the power transmission apparatus 101. An example of the control unit 201 is a central processing unit (CPU) equipped with a timer 207 and a memory 208. The control unit 201 executes a control program stored in the memory 208 to control the entire power transmission apparatus 101. The control unit 201 also uses the memory 208 when storing a value of a variable during execution of the control program. The control unit 201 uses the timer 207 when measuring time.

A power supply 202 supplies power when the power transmission apparatus 101 performs wireless power transmission. The power supply 202 is a commercial power supply or a battery. A power transmission unit 203 is intended to convert direct-current or alternating-current power input from the power supply 202 into alternating-current frequency power in a transmission band, and generate, via a transmission antenna 205, electromagnetic waves for the power reception apparatus 102 to receive. Based on instructions from the control unit 201, the power transmission unit 203 adjusts the electromagnetic waves in intensity so that power corresponding to any one of detection power transmission, authentication power transmission, and charging power transmission to be described below is output from the power transmission antenna 205. The intensity is adjusted by adjusting a voltage (power transmission voltage) input to the power transmission antenna 205. The higher the power transmission voltage, the higher the intensity of the electromagnetic waves. Based on instructions from the control unit 201, the power transmission unit 203 performs control to stop the power transmission from the power transmission antenna 205.

A detection unit 204 detects the power transmission voltage and the magnitude of a current (power transmission current) in the power transmission antenna 205. The power transmission voltage and the power transmission current detected by the detection unit 204 are read by the control unit 201. If a correlation of the power transmission voltage and power transmission current with the voltage and current input from the power supply 202 to the power transmission unit 203 is known in advance, the detection unit 204 may be configured to detect the voltage and current input to the power transmission unit 203. In such a case, the control unit 201 can determine the power transmission voltage and the power transmission current by calculation based on the known correlation, using the detected values obtained from the detection unit 204.

A communication unit 206 is intended to communicate with the power reception apparatus 102. The communication unit 206 includes a chip for controlling wireless communication compliant with BLE and an antenna for transmitting a signal. A notification unit 209 is intended to notify the user of information. Based on instructions from the control unit 201, the notification unit 209 performs display control to cause a display unit, such as a liquid crystal display (LCD), to display information. The notification unit 209 may use a display unit other than an LCD. The notification unit 209 may include a speaker and notify the user of information by using sound.

The power transmission apparatus 101 is not limited to an apparatus dedicated to power transmission and may be another apparatus. Examples of such an apparatus include a printer and a personal computer (PC).

Next, a configuration of the power reception apparatus 102 of the wireless power transmission system will be described with reference to FIG. 3. A control unit 301 controls the power reception apparatus 102. Similar to the control unit 201, an example of the control unit 301 is a CPU equipped with a timer 307 and a memory 308. A communication unit 306 includes a chip for controlling wireless communication compliant with BLE and an antenna for transmitting a signal. A power reception antenna 305 is intended to receive wireless power transmission from the power transmission apparatus 101. A power reception unit 303 generates power from electromagnetic waves received by the power reception antenna 305. The power reception unit 303 produces resonance with the electromagnetic waves received by the power reception antenna 305, and obtains alternating-current power from the resonance. The power reception unit 303 then converts the alternating-current power into direct-current or alternating-current power having a desired frequency, and outputs the resulting power. A battery 302 is a rechargeable battery. The battery 302 stores the power received by the power reception apparatus 102. A full-charge detection unit 310 detects the voltage of the battery 302. Based on the detection result of the full-charge detection unit 310, the control unit 301 can detect whether the battery 302 is fully charged, and a charging status. The control unit 301 uses a switch 309 to control whether to output the received power to the battery 302. If the switch 309 is ON, the power is output to the battery 302. If the switch 309 is OFF, the power is not output to the battery 302 but output to the power reception unit 303, the control unit 301, and the communication unit 306. In an initial state, the switch 309 is OFF.

A detection unit 304 detects an electromotive force (power reception voltage) generated in the power reception antenna 305 by the electromagnetic waves transmitted from the power transmission antenna 205. The power reception voltage detected by the detection unit 304 can be referred to by the control unit 301. Similar to the detection unit 204, the detection unit 304 may be configured to detect the voltage output from the power reception unit 303.

The power reception unit 303, the control unit 301, and the communication unit 306 of the power reception apparatus 102 may run on the power transmitted from the power transmission apparatus 101. With such a configuration, the power reception apparatus 102 can start to communicate with the power transmission apparatus 101 even if the power reception apparatus 102 does not have power needed to initiate wireless power transmission with the power transmission apparatus 101. The power reception unit 303, the control unit 301, and the communication unit 306 may run on power supplied from the battery 302.

Examples of the power reception apparatus 102 may include a digital camera and a mobile phone.

Figure 2:
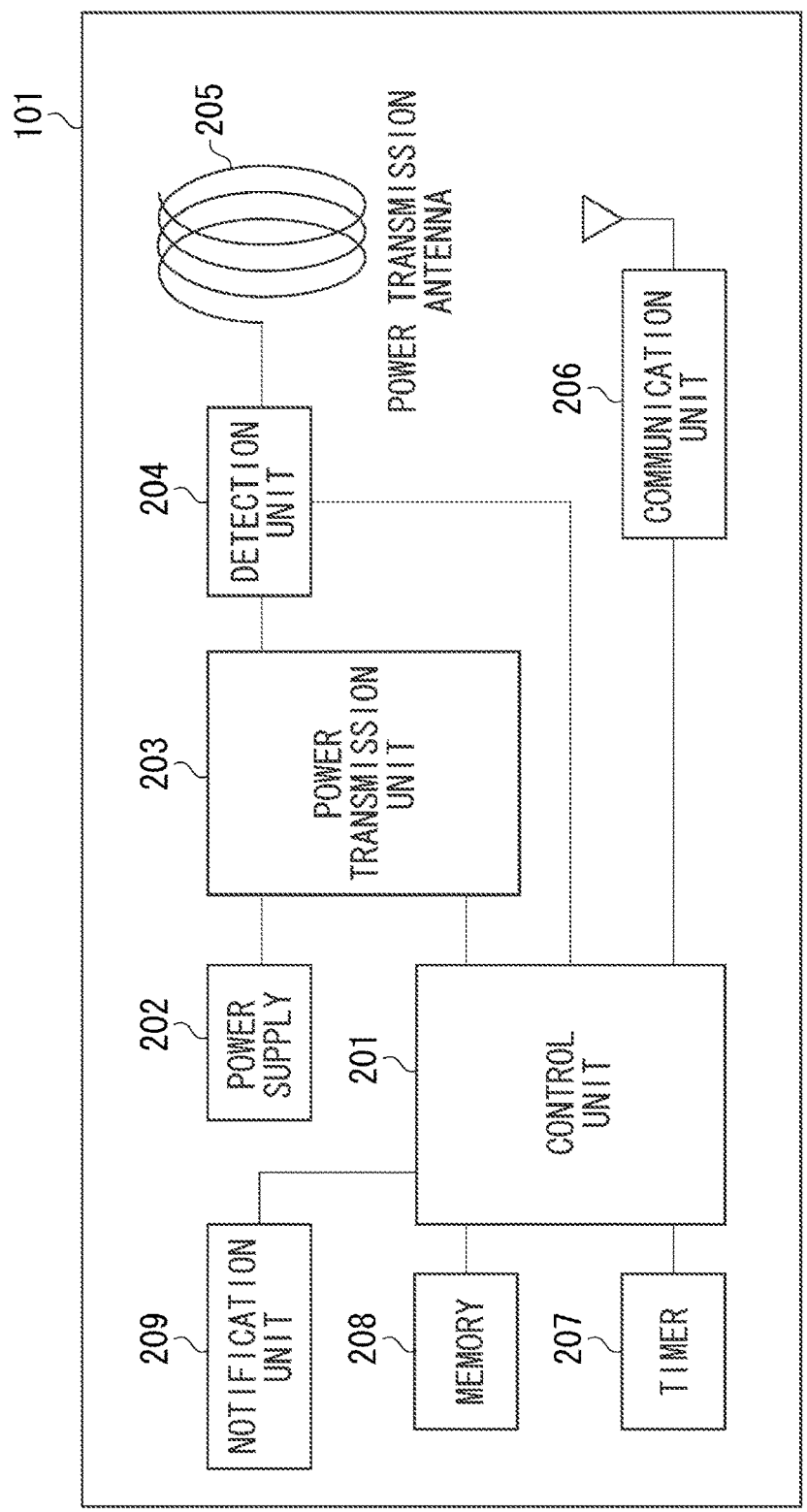
FIG. 2 is a diagram illustrating a configuration of a power transmission apparatus.
Figure 3:
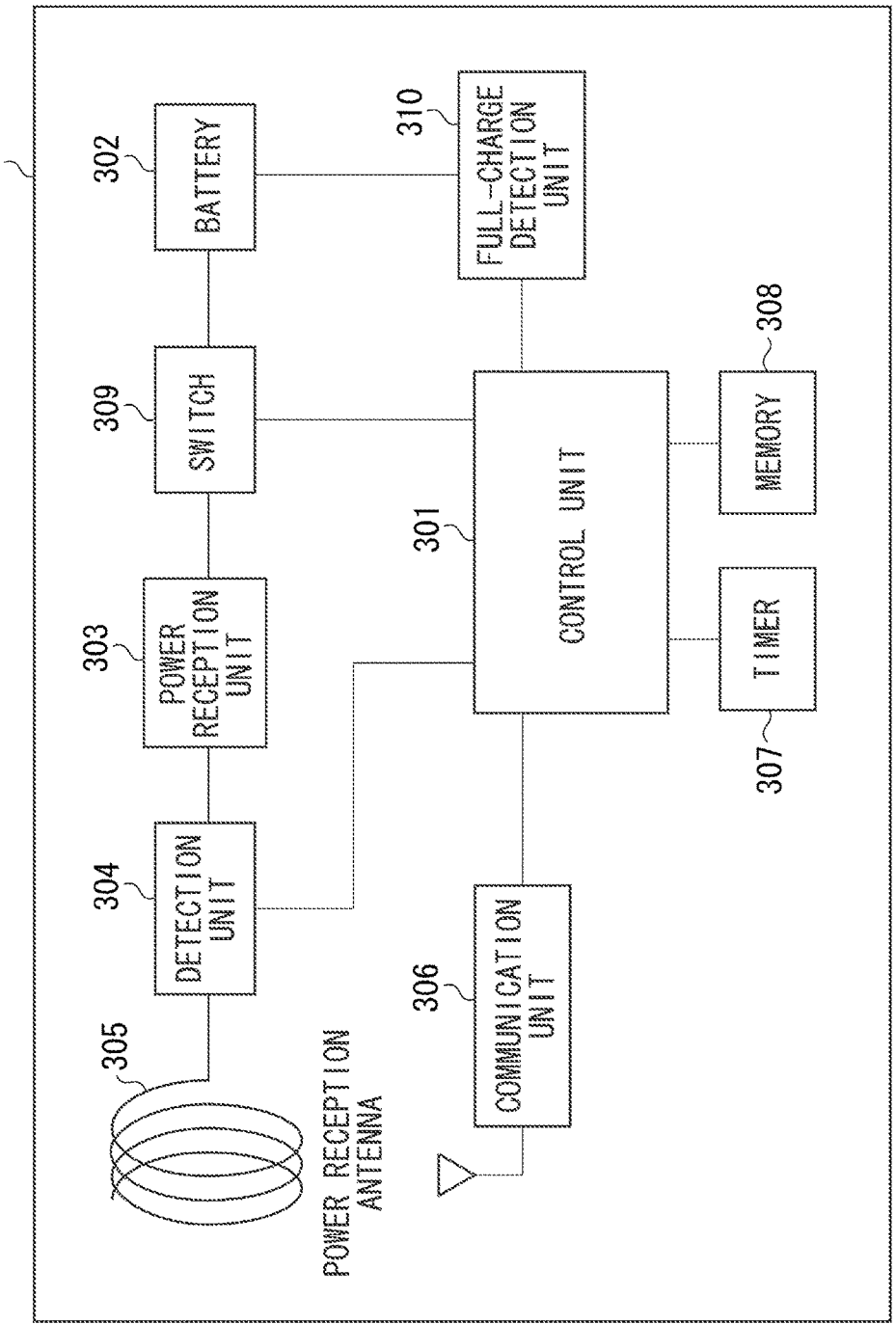
FIG. 3 is a diagram illustrating a configuration of a power reception apparatus.

The configurations illustrated in FIGS. 2 and 3 are just an example. The power transmission apparatus 101 and the power reception apparatus 102 may include a hardware configuration other than the illustrated hardware configurations. For example, the power transmission apparatus 101 and the power reception apparatus 102 may include an operation unit for the user to make various inputs and operate the apparatuses.

The power transmission apparatus 101 in the wireless power transmission system having the foregoing configuration selectively performs any one of detection power transmission, authentication power transmission, and charging power transmission.

The detection power transmission is power transmission for detecting whether at least one object is placed on the charging stand 103. In the detection power transmission, the power transmission apparatus 101 intermittently generates weak electromagnetic waves from the power transmission antenna 205. This can suppress power consumption in a period when no object is placed. If an object is placed in the range 110 (power transmittable range) of the power transmission apparatus 101, the power of the detection power transmission is consumed by the object. In such a case, the power transmission antenna 205 of the power transmission apparatus 101 changes in impedance, and a current different from in a steady state, that is, a state where no power receiving object is placed flows through the power transmission antenna 205. The detection unit 204 can detect the change to detect that an object is placed in the power transmittable range 110 of the own apparatus.

A change value of the detection result of the detection by the detection unit 204 when the power reception apparatus 102 is in the power transmittable range 110 is stored in the power transmission apparatus 101 in advance. If the detection result of the detection by the detection unit 204 shows an amount of change exceeding the change value stored in advance with respect to the detection result in the steady state, the power transmission apparatus 101 detects that an object is placed in the power transmittable range 110. If the detection result of the detection by the detection unit 204 shows an amount of change not exceeding the change value stored in advance with respect to the detection result in the steady state, the power transmission apparatus 101 may determine that there is a foreign object other than the power reception apparatus 102 in the power transmittable range 110. In such a case, the power transmission apparatus 101 may perform error processing for stopping power transmission or displaying information prompting the user to remove the foreign object.

The authentication power transmission is power transmission for supplying a power reception apparatus 102 existing in the power transmittable range 110 with power that the power reception apparatus 102 needs for communication intended for authentication, or more specifically, power sufficient for the control unit 301 and the communication unit 306 of the power reception apparatus 102 to activate. If the power transmission apparatus 101 detects that there is an object in the power transmittable range 110 of the own apparatus, the power transmission apparatus 101 starts the authentication power transmission.

The power reception apparatus 102 receiving the authentication power transmission transmits an advertising packet from the communication unit 306 within a certain period (for example, 100 ms) from when the authentication power transmission is detected. The advertising packet is intended to cause other apparatuses to transmit a communication connection request. If the power transmission apparatus 101 receives the advertising packet from the power reception apparatus 102 responding to the authentication power transmission, the power transmission apparatus 101 determines that the power reception apparatus 102 is in the power transmittable range 110.

The advertising packet is a signal to be broadcast, defined by BLE. The advertising packet is a notification signal for notifying adjacent BLE-capable devices of the existence of the own apparatus. The advertising packet includes information such as the own device name, a type of service to provide, and a version of a protocol used for communication. The advertising packet is used to notify devices nearby of the existence of the own apparatus and that the own apparatus is waiting for a connection from the devices nearby. The advertising packet from the power reception apparatus 102 includes service information indicating that the wireless power transmission method corresponding to the present wireless power transmission system can be executed. In the following description, the advertising packet will be referred to as an existence notification.

If the power transmission apparatus 101 does not receive the existence notification from the power reception apparatus 102 within a predetermined period (for example, 100 ms) from the start of the authentication power transmission, the power transmission apparatus 101 stops the authentication power transmission. The power transmission apparatus 101 then intermittently generates electromagnetic waves from the power transmission apparatus 205 again to intermittently perform the detection power transmission.

The power transmission apparatus 101 transmits a connection request packet (connection request) from the communication unit 206 to the power reception apparatus 102 from which the received existence notification is transmitted. The power transmission apparatus 101 then establishes communication connection with the power reception apparatus 102 according to the transmitted connection request. Using the established wireless connection, the power transmission apparatus 101 and the power reception apparatus 102 perform authentication processing for performing negotiation for power transmission. In the authentication processing, the power transmission apparatus 101 and the power reception apparatus 102 communicate (exchange) capability information with each other during the period of the established communication connection. Examples of the capability information include a transmittable or receivable amount of power, a hardware configuration, a supported power transmission method, a version of a supported power transmission standard, and a version of a communication protocol. In BLE, occasions to exchange data packets occur periodically. Such an occasion will be referred to as a connection event. By using a data packet transmitted at the first connection event, the power transmission apparatus 101 requests the power reception apparatus 102 to provide notification of a needed power value. The power reception apparatus 102 in response transmits the next data packet including the needed power value.

In the authentication processing, authentication succeeds if the versions of the protocols of the power transmission apparatus 101 and the power reception apparatus 102 coincide with each other and the power requested by the power reception apparatus 102 is equal to or lower than that the power transmission apparatus 101 can transmit. If not, the authentication fails. In such cases, since the negotiation related to the amount of power or the protocols between the power transmission apparatus 101 and the power reception apparatus 102 fails, the power transmission apparatus 101 does not perform charging power transmission.

The authentication also fails if the information needed for the authentication is not able to be obtained from the power reception apparatus 102 within the predetermined time from the start of the authentication power transmission. In the authentication processing, the power transmission apparatus 101 and the power reception apparatus 102 may communicate a password(s) for authentication. If the password(s) communicated by either one or both of the power transmission apparatus 101 and the power reception apparatus 102 is/are determined to be correct, the authentication may be determined to succeed.

By such authentication processing, the power transmission apparatus 101 can confirm that the object existing in the power transmittable range 110 is a power reception apparatus requesting power transmission. By the authentication processing, the power reception apparatus 102 can check whether the communication-connected power transmission apparatus 101 can supply power. The power transmission apparatus 101 continues the authentication power transmission during the authentication processing to transmit power for making the power reception apparatus 102 transmit the capability information.

If the authentication by the authentication processing succeeds, or equivalently, if the negotiation with the power reception apparatus 102 succeeds, the power transmission apparatus 101 performs charging power transmission. For the charging power transmission, the power transmission apparatus 101 transmits power higher than that of the detection power transmission and the authentication power transmission to the power reception apparatus 102. When performing the charging power transmission, the power transmission apparatus 101 receives control information for controlling wireless power transmission from the power reception apparatus 102 via the communication unit 206. Examples of the control information include the value of power being received, a request to increase or decrease the amount of power to be transmitted, and a request to stop power transmission. In other words, the charging power transmission is power transmission according to requests from the power reception apparatus 102. If the power transmission apparatus 101 receives a power transmission stop request to stop the power transmission from the power reception apparatus 102 or if a power transmission error occurs, the power transmission apparatus 101 ends the charging power transmission. The control information from the power reception apparatus 102 may include error information. For example, if the power transmission apparatus 101 receives control information indicating the occurrence of an error from the power reception apparatus 102, the power transmission apparatus 101 may stop the power transmission. If the power transmission apparatus 101 receives a full-charge notification indicating that the power reception apparatus 102 is fully charged, the power transmission apparatus 101 stops the charging power transmission to the power reception apparatus 102 from which the full-charge notification is transmitted. When the power transmission apparatus 101 is transmitting power to a plurality of power reception apparatuses 102, the power transmission apparatus 101 may receive a power transmission stop request from one of the power reception apparatuses 102. In such a case, the power transmission apparatus 101 stops the charging power transmission to the power reception apparatus 102 from which the power transmission stop request is transmitted, and continues transmitting power to the rest of the power reception apparatuses 102.

If the authentication processing succeeds, the power reception apparatus 102 changes the switch 309 from OFF to ON by using the control unit 301 to store the power supplied by the charging power transmission. In other words, the power reception apparatus 102 prevents power from being supplied to the battery 302 until the charging power transmission is started. To end charging, the power reception apparatus 102 changes the switch 309 from ON to OFF by using the control unit 301.

The power transmission apparatus 101 can transmit power to a plurality of power reception apparatuses 102. For example, suppose that the power transmission apparatus 101 is performing the charging power transmission to a first power reception apparatus. If a second power reception apparatus requesting new power reception detects the charging power transmission to the first power reception apparatus, the second power reception apparatus transmits an existence notification to the power transmission apparatus 101. Receiving the existence notification, the power transmission apparatus 101 starts the authentication processing on the second power reception apparatus. If the authentication succeeds, the power transmission apparatus 101 starts the charging power transmission to the second power reception apparatus. In such a manner, the power transmission apparatus 101 can simultaneously perform the charging power transmission to a plurality of power reception apparatuses 102 in parallel.

Figure 5:
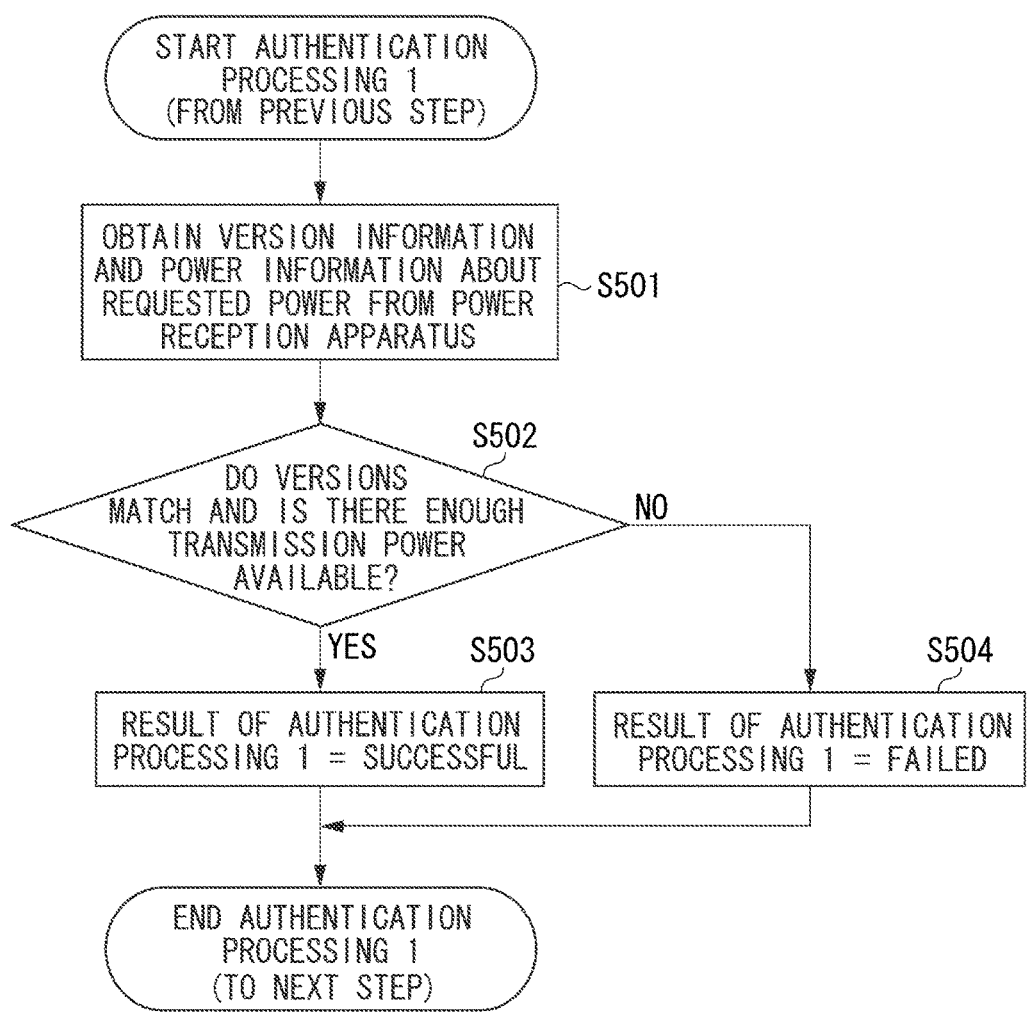
FIG. 5 is a flowchart illustrating authentication processing 1.
Figure 6:
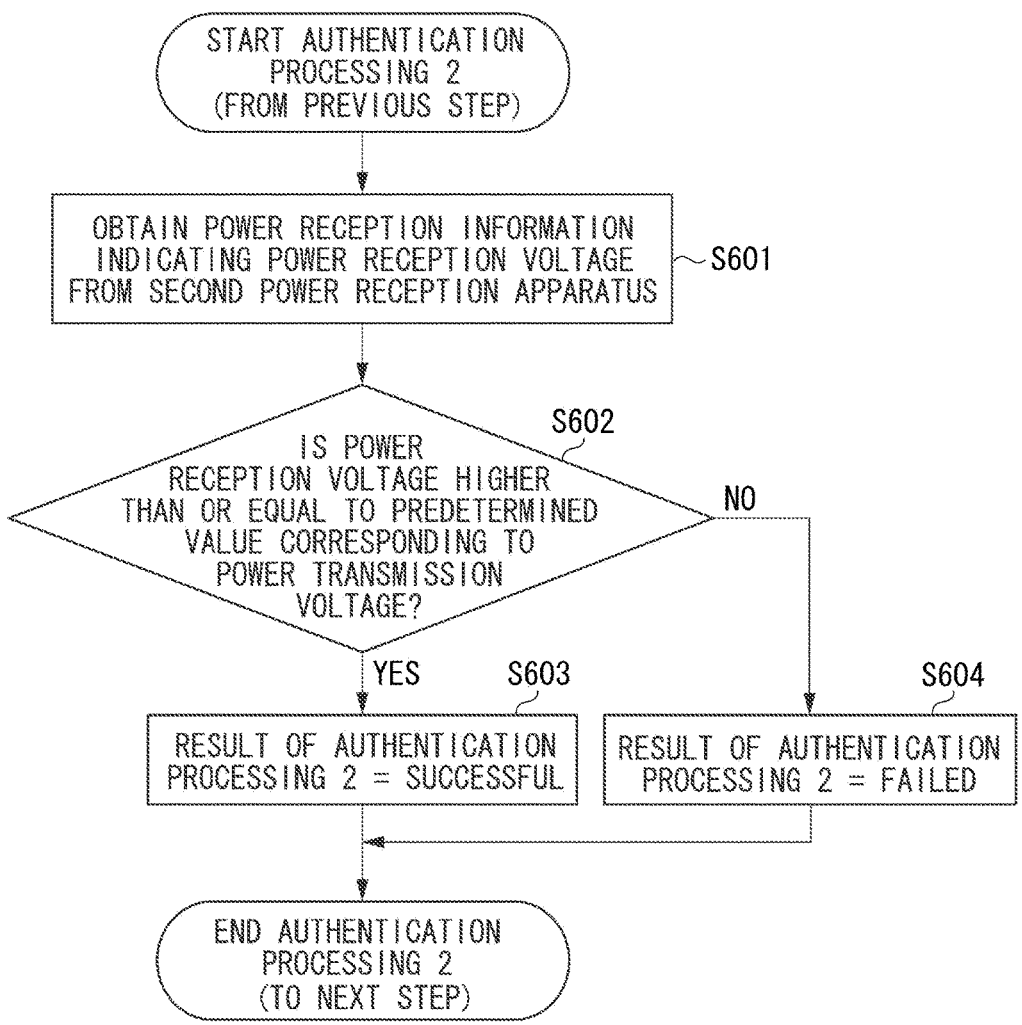
FIG. 6 is a flowchart illustrating authentication processing 2.

An operation of the wireless power transmission system which performs the wireless power transmission according to the present exemplary embodiment will be described with reference to the flowcharts illustrated in FIGS. 4 (4A and 4B) to 6. FIG. 4 (4A and 4B) is a flowchart illustrating the entire operation of the power transmission apparatus 101. FIGS. 5 and 6 are flowcharts illustrating details of authentication processing 1 and 2 described below, respectively. The flowcharts illustrated in FIGS. 4 (4A and 4B) to 6 are implemented by the control unit 201 executing the control program stored in the memory 208 and performing calculation and processing of information and control of various pieces of hardware. Part or all of the steps illustrated in the flowcharts illustrated in FIGS. 4 (4A and 4B) to 6 may be configured to be implemented by hardware such as an application specific integrated circuit (ASIC).

The processing illustrated in FIG. 4 (4A and 4B) is started when the power transmission apparatus 101 is powered on. The processing illustrated in FIG. 4 (4A and 4B) ends when the power transmission apparatus 101 is powered off.

In step S401, the control unit 201 of the power transmission apparatus 101 starts to operate, and controls the power transmission unit 203 to perform the detection power transmission from the power transmission antenna 205. The power transmission apparatus 101 then performs detection processing for detecting an object placed on the charging stand 103 based on a detection result of the detection by the detection unit 204 during the detection power transmission. If an object is detected by the detection processing, then in step S402, the control unit 201 controls the power transmission unit 203 to start the authentication power transmission from the power transmission antenna 205.

In step S403, the power transmission apparatus 101 determines whether an existence notification (advertising packet) is received by the communication unit 206 within a predetermined time from the start of the authentication power transmission and the existence notification includes information indicating the power reception apparatus 102.

The existence notification transmitted by the power reception apparatus 102 includes information indicating that the own apparatus is a power reception apparatus and power reception information indicating a power reception voltage. Such information is stored in an AD structure of Type=FF, which is a message element of the existence notification. The existence notification transmitted by the power reception apparatus 102 according to the present exemplary embodiment includes identification (ID) information. The ID information is stored in AdvA, a message element of the existence notification.

In step S403, if the existence notification from the power reception apparatus 102 is not received (NO in step S403), i.e., if the detected object is not the power reception apparatus 102, then in step S417, the power transmission apparatus 101 notifies the user, via the notification unit 209, to remove the object placed on the charging stand 103. Thereafter, if the removal of the placed object is detected, the processing returns to step S401.

In step S403, if the existence notification from the power reception apparatus 102 is received (YES in step S403), the power transmission apparatus 101 transmits a connection request to the transmission source of the received existence notification via the communication unit 206, and establishes communication connection therewith. In step S404, the power transmission apparatus 101 performs authentication processing 1 on the power reception apparatus 102 by using the established communication connection.

The authentication processing 1 in step S404 will be described with reference to the flowchart illustrated in FIG. 5. The authentication processing 1 is processing for checking the communication capability of the power reception apparatus 102 and the power transmission capability of the power transmission apparatus 101. In step S501, the power transmission apparatus 101 initially obtains version information and power information about requested power from the power reception apparatus 102 via the communication unit 206. The version information includes version information about the communication protocol by which the power transmission apparatus 101 and the power reception apparatus 102 communicate with each other in the wireless power transmission. In step S502, the power transmission apparatus 101 checks whether the version of the communication protocol supported by the own apparatus matches the version of the communication protocol supported by the power reception apparatus 102. The power transmission apparatus 101 further checks whether the power requested by the power reception apparatus 102 can be transmitted.

If the versions and the power values of the power transmission apparatus 101 and the power reception apparatus 102 match (YES in step S502), then in step S503, the power transmission apparatus 101 determines the result of the authentication processing 1 to be successful. The processing ends. If not (NO in step S502), then in step S504, the power transmission apparatus 101 determines the result of the authentication processing 1 to be failed. The processing ends. The authentication processing 1 may include performing authentication based on a password, identification information, and/or other information.

Return to the description of FIG. 4 (4A and 4B). In step S405, if the authentication result of the authentication processing 1 is determined to be failed (NO in step S405), the processing proceeds to step S417. In such a case, the notification unit 209 may display the cause of the authentication failure. For example, if the authentication fails due to a difference in the version information, the notification unit 209 may display information indicating that the authentication fails due to a difference in the version information, and information prompting the user to update firmware for version update.

In step S405, if the authentication result of the authentication processing 1 is determined to be successful (YES in step S405), then in step S406, the power transmission apparatus 101 notifies the authenticated power reception apparatus 102 of a start of power transmission via communication by the communication unit 206. The power transmission apparatus 101 controls the power transmission unit 203 to start charging power transmission from the power transmission antenna 205. In the charging power transmission, the power transmission apparatus 101 transmits high power with which the power reception apparatus 102 can charge the battery 302. The power reception apparatus 102 that has received the notification of the start of power transmission turns ON the switch 309 to start charging the battery 302.

Through the foregoing processing of steps S401 to S406, the power transmission apparatus 101 can detect the placement of the first power reception apparatus by using the detection power transmission, and start the charging power transmission to the first power reception apparatus. The processing of step S407 and the subsequent steps is processing for detecting the placement of the second or a subsequent power reception apparatus and starting the charging power transmission to the second power reception apparatus while performing the charging power transmission to the first power reception apparatus. In the following description, the first power reception apparatus will be referred to as a first power reception apparatus, and a new power reception apparatus detected will be referred to as a second power reception apparatus. The first and second power reception apparatuses have the configuration of the power reception apparatus 102 described with reference to FIG. 3.

In step S407, the power transmission apparatus 101, while performing the charging power transmission of step S406, monitors an existence notification from another power reception apparatus (second power reception apparatus). If the existence notification is received (YES in step S407), then in step S408, the power transmission apparatus 101 performs authentication processing 2 on the second power reception apparatus from which the existence notification is transmitted. The authentication processing 2 is processing performed for checking whether the second power reception apparatus is an apparatus placed on the charging stand 103 if the existence notification is received from the second power reception apparatus while the power transmission apparatus 101 is performing the charging power transmission to the first power reception apparatus. In other words, the authentication processing 2 is processing for checking whether the second power reception apparatus is brought close to the power transmission apparatus 101 by the user for the purpose of charging.

The authentication processing 2 will be described with reference to the flowchart illustrated in FIG. 6. In step S601, the power transmission apparatus 101 obtains power reception information indicating the power reception voltage of the second power reception apparatus, the power reception information being included in the existence notification received from the second power reception apparatus. The second power reception apparatus detects the power reception voltage via the detection unit 304, and transmits the existence notification including the detected power reception voltage. The power transmission apparatus 101 can thus obtain the power reception voltage of the second power reception apparatus from the existence notification received in step S407. In step S602, the power transmission apparatus 101 compares a predetermined value, which is set according to the voltage (power transmission voltage) input to the power transmission antenna 205, with the power reception voltage obtained in step S601.

The second power reception apparatus targeted for the authentication processing 2 consumes a substantially constant amount of power supplied from the power supply apparatus 101 during the period when the authentication processing 2 is performed. The second power reception apparatus has not received a power transmission start notification yet, and the switch 309 is OFF. In this state, components that consume the received power in the second power reception apparatus are the power reception unit 303, the control unit 301, and the communication unit 306. In a power reception apparatus in wireless power transmission, the power consumed by such units is typically extremely small as compared to that consumed for the main purpose of the power reception apparatus, i.e., the charging of a battery, and can be regarded as being substantially constant. If the power consumption of the power reception apparatus is constant, the electromotive force occurring in a power reception antenna increases as the intensity of the electromagnetic waves output from the transmission antenna increases. In other words, the higher the power transmission voltage, the higher the power reception voltage of the power reception antenna. The power reception voltage also increases as the relative position of the power reception antenna to the power transmission antenna becomes closer.

As such, the power transmission apparatus 101 can estimate a positional relationship between the power transmission antenna 205 and the power reception antenna 305 of the second power reception apparatus based on a relationship between the power transmission voltage and the power reception voltage of the second power reception apparatus. The power transmission apparatus 101 can thus determine whether the second power reception apparatus is an apparatus placed on the charging stand 103. While the power transmission apparatus 101 is described to determine whether the second power reception apparatus is an apparatus placed on the charging stand 103, the power transmission apparatus 101 may determine whether the second power reception apparatus exists within the range 110.

FIG. 7 illustrates a table 700 indicating the relationship between the power transmission voltage and the power reception voltage when the second power reception apparatus is placed on the charging stand 103. For example, suppose that the power transmission voltage or the detection result of the detection by the detection unit 204 when the charging power transmission to the first power reception apparatus is performed is 20 V. From a row 702 of the table 700, if the power reception voltage of the second power reception apparatus is 11 V or above, the second power reception apparatus is placed on the charging stand 103.

With the power reception voltage according to the power transmission voltage illustrated in FIG. 7 as a predetermined value, the power transmission apparatus 101 compares the predetermined value with the power reception voltage obtained in step S601. In step S602, if the power reception voltage obtained in step S601 is higher than or equal to the predetermined value (YES in step S602), then in step S603, the power transmission apparatus 101 determines the authentication result of the authentication processing 2 to be successful. The processing ends. In other words, if a power reception value corresponding to the power reception information included in the notification signal received from the second power reception apparatus is a sufficient value, the power transmission apparatus 101 determines to target the second power reception apparatus for the negotiation of the authentication processing.

If the power reception voltage obtained in step S601 is lower than the predetermined value (NO in step S602), then in step S604, the power transmission apparatus 101 determines the authentication result of the authentication processing 2 to be failed. The processing ends. In other words, if the power reception value corresponding to the power reception information included in the notification signal received from the second power reception apparatus is not a sufficient value, the power transmission apparatus 101 determines not to target the second power reception apparatus for the charging power transmission.

The table 700 illustrated in FIG. 7 is stored in the memory 208 in advance. The power transmission apparatus 101 may generate the table 700 illustrated in FIG. 7 by itself, and store the table 700 in the memory 208.

In such a manner, based on the information included in the existence notification which can be transmitted and received before establishment of a communication connection, the power transmission apparatus 101 can determine whether the power reception apparatus from which the existence notification is transmitted is an apparatus placed on the charging stand 103 and requesting power reception, before the establishment of the communication connection. The power transmission apparatus 101 can detect the power reception apparatus placed on the charging stand 103 even if the power transmission apparatus 101 is performing charging power transmission and not able to perform the detection power transmission.

In step S416, if the result of the authentication processing 2 is determined to be failed (NO in step S416), the processing proceeds to step S412. In such a case, i.e., if the result of the authentication processing 2 is failed, the power transmission apparatus 101 may display an error notification via the notification unit 209. As a display example, a message "There is a power reception apparatus nearby. To charge the power reception apparatus, place it on the charging stand. To not charge the power reception apparatus, separate it from the charging stand" may be displayed. In other words, the power transmission apparatus 101 may display, via the notification unit 209, information prompting the user to move the apparatus of which the result of the authentication processing 2 is failed. In such a manner, if the user desires to charge the second power reception apparatus and the result of the authentication processing 2 is failed, the power transmission apparatus 101 can notify the user of a correct placement position. As a result, the second power reception apparatus can be charged.

If the result of the authentication processing 2 is determined to be failed (NO in step S416), the power transmission apparatus 101 may instruct, via the communication unit 206, the second power reception apparatus not to issue the existence notification. Receiving the instruction, the control unit 301 of the second power reception apparatus performs control not to transmit the existence notification from the communication apparatus 306 for a predetermined time from the reception of the instruction by using the timer 307. The power transmission apparatus 101 may be configured to store ID information about the second power reception apparatus of which the authentication processing 2 is performed and failed, and ignore the existence notification including the ID information for a predetermined time in step S407. If the result of the authentication processing 2 is determined to be failed (NO in step S416), the processing may proceed to step S414. In other words, if the result of the authentication processing 2 is determined to be failed, the power transmission apparatus 101 may stop even the charging power transmission to the first power reception apparatus and prompt the user to remove the object on the charging stand 103. In such a manner, power transmission can be stopped if a foreign object is placed on the charging stand 103 during the charging power transmission.

In step S416, if the result of the authentication processing 2 is determined to be successful (YES in step S416), then in step S409, the power transmission apparatus 101 performs the authentication processing 1 described with reference to FIG. 5. In such a manner, whether to perform the authentication processing 1 on the second power reception apparatus can be switched depending on the result of the authentication processing 2. The authentication processing 2 can thus be said to be processing for determining whether to perform the authentication processing 1 according to the information included in the existence notification. In step S502 of the authentication processing 1 in step S409, there is determined to be enough transmission power available if the sum of the values of the power requested by the second power reception apparatus and the power being transmitted to the first power reception apparatus is less than a maximum value of power capable of power transmission by the power transmission apparatus 101. If the authentication processing 1 of step S409 succeeds (YES in step S410), then in step S411, the power transmission apparatus 101 notifies the second power reception apparatus of a start of power transmission, and starts the charging power transmission to the second power reception apparatus.

If the authentication processing 1 of step S409 fails (NO in step S410), the processing proceeds to step S412 without the power transmission apparatus 101 transmitting a power transmission start notification to the second power reception apparatus. In such a case, the power transmission apparatus 101 may display the reason of the failure of the authentication processing 1 via the notification unit 209. If the authentication processing 1 of step S409 fails (NO in step S410), the processing may proceed to step S414. More specifically, if the authentication processing 1 of step S409 fails (NO in step S410), the power transmission apparatus 101 may stop even the charging power transmission to the first power reception apparatus and prompt the user to remove the object on the charging stand 103. In such a manner, if a foreign object is placed on the charging stand 103 during the charging power transmission, the power transmission apparatus 101 can stop the power transmission.

In step S412, the power transmission apparatus 101 determines whether a full-charge notification or a power transmission stop request is received by the communication unit 206 from any of the power reception apparatuses under charging power transmission. In step S412, if a full-charge notification or a power transmission stop request is determined not to be received (NO in step S412), the power transmission apparatus 101 repeats the processing from step S407. In step S412, if a full-charge notification or a power transmission stop request is determined to be received (YES in step S412), then in step S413, the power transmission apparatus 101 transmits, via the communication unit 206, a power transmission stop notification to the power reception apparatus 102 from which the full-charge notification or power transmission stop request is transmitted. In step S414, the power transmission apparatus 101 stops the charging power transmission to the power reception apparatus from which the full-charge notification or power transmission stop request is transmitted, and notifies the user of the completion of charging via the notification unit 209.

In step S415, the power transmission apparatus 101 determines whether there is any power reception apparatus under charging power transmission. In step S415, if there is determined to be no power reception apparatus 102 under charging power transmission (NO in step S415), the power transmission apparatus 101 repeats the processing from step S401. In step S415, if there is determined to be at least one power reception apparatus under charging power transmission (YES in step S415), the power transmission apparatus 101 repeats the processing from step S407.

As describe above, the power transmission apparatus 101 determines whether the first power reception apparatus (power reception apparatus 102) is placed on the charging stand 103 by using the detection power transmission. Even if the power transmission apparatus 101 is performing charging power transmission and not able to perform the detection power transmission, the power transmission apparatus 101 can determine whether a power reception apparatus from which an existence notification is transmitted is an apparatus placed on the charging stand 103 based on the information included in the existence notification. The power transmission apparatus 101 then performs the authentication processing 1 only on a power reception apparatus that is determined to be placed on the charging stand 103 based on the existence notification transmitted therefrom. The power transmission apparatus 101 does not perform the authentication processing 1 on a power reception apparatus that is not determined to be placed on the charging stand 103 based on the existence notification transmitted therefrom. Since the power transmission apparatus 101 does not perform the authentication processing 1 or the charging power transmission on a power reception apparatus of which charging is not needed, such as a power reception apparatus that is not intended to be charged by the user and happens to be placed near the power transmission apparatus 101, processing for needless power transmission can be reduced.

The power transmission apparatus 101 can determine whether a power reception apparatus from which an existence notification is transmitted is an apparatus placed on the charging stand 103, based on the information included in the existence notification which can be transmitted and received before establishment of a communication connection. This can reduce needless communication connections and authentication processing.

An operation of the wireless power transmission system according to the present exemplary embodiment will be described with reference to FIG. 8.

Suppose that the power transmission apparatus 101 is performing charging power transmission to a power reception apparatus 801 with a power transmission voltage of 20 V when a new power reception apparatus 802 is placed on the charging stand 103. Here, as illustrated in FIG. 7, an electromotive force of 11 V or above occurs in the power reception antenna 305 of the power reception apparatus 802. The power reception apparatus 802 transmits an existence notification by using the electromotive force. In step S407, the power transmission apparatus 101 detects the existence notification, and starts the authentication processing 2 of the power reception apparatus 802. In step S602, since the current power transmission voltage is 20 V and the power reception voltage is 11 V or above, the result of the authentication processing 2 is determined to be successful (steps S601 to S603). Even while performing the charging power transmission, the power transmission apparatus 101 can thus detect the power reception apparatus 802 placed on the charging stand 103 and start charging power transmission to the power reception apparatus 802.

Suppose that a power reception apparatus 803 is placed near the power transmission apparatus 101 which is transmitting power with a power transmission voltage of 20 V. The power transmission apparatus 101 performs charging power transmission of higher power than that of detection power transmission and authentication power transmission. The power transmission apparatus 101 can thus supply power needed for authentication to a wider range than the range 110 where a power reception apparatus can be detected by detection power transmission and authenticated by authentication power transmission. As a result, the power reception apparatus 803 which does not need to be charged comes to transmit an existence notification. However, since the power reception apparatus 803 is not placed on the charging stand 103, the electromotive force occurring in the power reception antenna 305 of the power reception apparatus 803 has a value smaller than 11 V.

Consequently, the power transmission apparatus 101 performing the charging power transmission of the power transmission voltage of 20 V determines the power reception apparatus 803 not to be successfully authenticated in the authentication processing 2. Since the power reception apparatuses placed within the power transmittable range can be correctly detected even during charging power transmission, the power transmission apparatus 101 does not perform the authentication processing 1 or charging power transmission on the power reception apparatus 803 which is considered not to need to be charged. The power reception apparatus 803 is located in a relatively remote position. Since the power transmission apparatus 101 does not transmit power to power reception apparatuses of low power transmission efficiency, the power consumption of the power transmission apparatus 101 can be reduced.

As described above, according to the present exemplary embodiment, even if a power reception apparatus outside the power transmittable range, such as the power reception apparatus 803 of FIG. 8, is activated by strong electromagnetic waves for charging power transmission and issues an existence notification, the authentication processing and charging power transmission for that power reception apparatus can be suppressed. Power reception apparatuses placed remote from the power transmission apparatus 101 are considered to be less likely to have a need to receive power. Since the power transmission apparatus 101 can be made less likely to target such power reception apparatuses for high-power discharging power transmission, the transmission of power to power reception apparatuses of low power transmission efficiency can be reduced.

In the foregoing exemplary embodiment, the power transmission apparatus 101 is configured to omit the authentication processing 1 on the second or a subsequent power reception apparatus if the authentication processing 2 fails. However, the power transmission apparatus 101 may perform the authentication processing 1 even if the authentication processing fails. The authentication processing 1 and the authentication processing 2 may be reversed in order.

In the foregoing exemplary embodiment, the power transmission apparatus 101 is described not to perform the authentication processing 2 on the power reception apparatus 102 detected by the detection power transmission, i.e., the first power reception apparatus for the power transmission apparatus 101 to transmit power to. However, the power transmission apparatus 101 may perform the authentication processing 2 on the first power reception apparatus. This improves the position detection accuracy in detecting a power reception apparatus 102. Since power transmission can be performed only on power reception apparatuses 102 having high power transmission efficiency (e.g. power reception apparatuses 102 placed on the charging stand 103) power consumption can be reduced.

In the foregoing exemplary embodiment, the wireless power transmission is described to be performed by placing the power reception apparatus(es) 102 on the power transmission apparatus 101 (charging stand 103). However, the wireless power transmission may be performed even if the power reception apparatus(es) 102 and the power transmission apparatus 101 are spatially separated. For example, the foregoing exemplary embodiment may be applied to a case where an electric car serving as a power reception apparatus 102 and the power transmission apparatus 101 built in a floor surface or road surface perform wireless power transmission in a noncontact state.

In the foregoing exemplary embodiment, the power reception apparatuses 102 are described to charge their batteries 302. However, the power received by the power reception apparatuses 102 may be used for applications other than charging. For example, the power may be used to drive a motor.

In the foregoing exemplary embodiment, the number of power reception apparatuses 102 under charging power transmission and the power transmission voltage may have a known correlation therebetween. Examples of such a situation include where the same power is uniformly supplied to the power reception apparatuses 102. In such a case, the power transmission voltage in the left column of the table 700 may be replaced with the number of power reception apparatuses 102. In the authentication processing 2, the power transmission apparatus 101 then determines whether the authentication succeeds based on the number of power reception apparatuses 102 under charging power transmission and the power reception voltage of the power reception apparatus 102 under the authentication processing 2.

In the authentication processing 2 of the foregoing exemplary embodiment, the power transmission apparatus 101 is described to perform authentication based on the power transmission voltage and the power reception voltage. However, the magnitudes of the currents flowing through the power transmission antenna 205 and the power reception antenna 305 may be used instead of the magnitudes of the voltages. In such a case, the detection units 204 and 304 are configured to detect the magnitudes of the currents in the respective antenna 205 and 305. The power transmission apparatus 101 is configured to perform authentication by using the magnitudes of the currents in the table 700 and in step S602. Similarly, the power transmission apparatus 101 may be configured to perform authentication by using a physical quantity that combines voltage and current, such as power.

In the authentication processing 2 of the foregoing exemplary embodiment, the existence notification includes the power reception voltage, and the power transmission apparatus 101 performs authentication based on the information about the power reception voltage. However, the power transmission apparatus 101 may perform the authentication processing 2 based on other information. For example, in the authentication processing 2 of the foregoing exemplary embodiment, a distance may be measured based on the communication between the power transmission apparatus 101 and the power reception apparatus 102, and a success or failure of authentication may be determined according to the distance between the apparatuses. For example, in the authentication processing 2, the power transmission apparatus 101 may determine the distance between the apparatuses based on the communication with the power reception apparatus 102. If the power reception apparatus 102 is in the range 110, the power transmission apparatus 101 may determine the authentication to be successful. If the power reception apparatus 102 is not in the range 110, the power transmission apparatus 101 may determine the authentication to be failed. The distance between the apparatuses may be measured by using ProXimity Profile (PXP) defined by BLE. PXP is a profile for measuring a distance between apparatuses based on an average level of a reception signal level (reception electric field strength) in a predetermined period.

According to the foregoing exemplary embodiment, the power transmission apparatus 101 can be made less likely to target a power reception apparatus that is less likely to have a need to receive power for high-power power transmission.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-055014, filed Mar. 18, 2015, which is hereby incorporated by reference herein in its entirety.

What is claimed is:

1. A power transmission apparatus comprising:
a power transmission circuit configured to perform power transmission;
a communication circuit configured to perform wireless communication; and
a control unit configured to control power transmission to a first power reception apparatus by the power transmission circuit in accordance with a result of a negotiation to establish power transmission with the first power reception apparatus using communication by the communication circuit,
wherein, where a signal is received by the communication circuit from a second power reception apparatus that is different from the first power reception apparatus during the power transmission to the first power reception apparatus, the control unit is configured to determine whether to perform a negotiation to establish power transmission with the second power reception apparatus on a basis of a comparison between a predetermined value and a power reception value that is included in the signal received from the second power reception apparatus, the power reception value indicating an amount of power received by the second power reception apparatus during the power transmission to the first power reception apparatus;

wherein, where it is determined to perform the negotiation with the second power reception apparatus, the control unit causes the power transmission circuit to perform power transmission to the second power reception apparatus in accordance with the result of negotiation with the second power reception apparatus, and where it is determined not to perform the negotiation with the second power reception apparatus, the control unit determines not to perform the negotiation with the second power reception apparatus, and thereby power transmission to the second power reception apparatus by the communication circuit is restricted.

2. The power transmission apparatus according to claim 1, wherein, where the power reception value included in the signal received from the second power reception apparatus is a value exceeding the predetermined value, the control unit causes the power transmission circuit to perform power transmission to the second power reception apparatus according to the result of negotiation with the second power reception apparatus, and where the power reception value included in the signal received from the second power reception apparatus is a value not exceeding the predetermined value, the control unit does not perform the negotiation to establish power transmission with the second power reception apparatus.

3. The power transmission apparatus according to claim 2, wherein the predetermined value is a value according to an amount of power transmitted to the first power reception apparatus by the power transmission circuit.

4. The power transmission apparatus according to claim 1, wherein, where the power reception value included in the signal received from the second power reception apparatus indicates existence of the second power reception apparatus in a power transmission range of the power transmission circuit, the control unit causes the power transmission circuit to perform power transmission to the second power reception apparatus according to the result of negotiation with the second power reception apparatus, and where the power reception value included in the signal received from the second power reception apparatus does not indicate the existence of the second power reception apparatus in the power transmission range of the power transmission circuit, the control unit does not perform the negotiation to establish power transmission with the second power reception apparatus.

5. The power transmission apparatus according to claim 1, wherein the power reception value included in the signal received from the second power reception apparatus is a power reception voltage value.

6. The power transmission apparatus according to claim 1, further comprising a detection circuit configured to detect an object existing in a predetermined range based on a change in impedance when detection power transmission by the power transmission circuit is performed, wherein the power transmission circuit performs authentication power transmission for supplying power necessary for communication with the power transmission apparatus in a case where the detection circuit detects an object existing in the predetermined range.

7. The power transmission apparatus according to claim 1, further comprising a display control unit configured to, where the negotiation with the second power reception apparatus fails, cause a display unit to display information for prompting a user to remove an object existing in a power transmission range.

8. The power transmission apparatus according to claim 1, wherein the power transmission circuit performs the power transmission by a magnetic field resonance method, an electromagnetic induction method, an electric field resonance method, a microwave method, or a power transmission method using a laser.

9. The power transmission apparatus according to claim 1, wherein the negotiation with the second power reception apparatus is performed based on power transmittable by the power transmission apparatus and power requested by the second power reception apparatus.

10. The power transmission apparatus according to claim 1, wherein the power transmission circuit performs power transmission that triggers the second power reception apparatus to transmit the signal.

11. The power transmission apparatus according to claim 1, wherein the power transmission circuit performs power transmission in a first level that is a level for detecting an object existing in a predetermined range and performs power transmission in a second level that is greater in power than the first level, and wherein, where the signal is received from the second power reception apparatus during performing the power transmission in the second level to the first power reception apparatus, the control unit determines whether to perform the negotiation with the second power reception apparatus or not on a basis of the power reception value corresponding to power reception information in the signal received from the second power reception apparatus.

12. The power transmission apparatus according to claim 1, wherein the control unit determines whether the second power reception apparatus exists in a predetermined range or not on the basis of the power reception value that is included in the signal received from the second power reception apparatus, wherein, where it is determined that the second power reception apparatus exists in the predetermined range, the control unit determines to perform the negotiation with the second power reception apparatus, and wherein, where it is determined that the second power reception apparatus does not exist in the predetermined range, the control unit determines not to perform the negotiation with the second power reception apparatus.

13. A method for controlling a power transmission apparatus including a power transmission circuit configured to perform power transmission, the method comprising:

performing wireless communication using a communication circuit of the power transmission apparatus;

performing power transmission to a first power reception apparatus by the power transmission circuit in accordance with a result of a negotiation to establish power transmission with the first power reception apparatus using communication by the communication circuit; and determining, where a signal is received by the communication circuit from a second power reception apparatus that is different from the first power reception apparatus during the power transmission to the first power reception apparatus, whether to perform a negotiation to establish power transmission with the second power reception apparatus on a basis of a comparison between a predetermined value and a power reception value that is included in the signal received from the second power reception apparatus, the power reception value indicating an amount of power received by the second power reception apparatus during the power transmission to the first power reception apparatus;

wherein, where it is determined to perform the negotiation with the second power reception apparatus, performing power transmission to the second power reception apparatus by the power transmission circuit in accordance with the result of negotiation with the second power reception apparatus, and where it is determined not to perform the negotiation with the second power reception apparatus, determining not to perform the negotiation with the second power reception apparatus, and thereby power transmission to the second power reception apparatus by the communication circuit is restricted.

14. A non-transitory storage medium storing a program for causing a power transmission apparatus to perform a control method, the power transmission apparatus including a power transmission circuit configured to perform power transmission, the control method comprising:

performing wireless communication using a communication circuit of the power transmission apparatus;

performing power transmission to a first power reception apparatus by the power transmission circuit in accordance with a result of a negotiation to establish power transmission with the first power reception apparatus using communication by the communication circuit; and determining, where a signal is received by the communication circuit from a second power reception apparatus that is different from the first power reception apparatus during the power transmission to the first power reception apparatus, whether to perform a negotiation to establish power transmission with the second power reception apparatus on a basis of a comparison between a predetermined value and a power reception value that is included in the signal received from the second power reception apparatus, the power reception value indicating an amount of power received by the second power reception apparatus during the power transmission to the first power reception apparatus;

wherein, where it is determined to perform the negotiation with the second power reception apparatus, performing power transmission to the second power reception apparatus by the power transmission circuit in accordance with the result of negotiation with the second power reception apparatus, and where it is determined not to perform the negotiation with the second power reception apparatus, determining not to perform the negotiation with the second power reception apparatus, and thereby power transmission to the second power reception apparatus by the communication circuit is restricted.

* * * * *